(12) United States Patent
Chang

(10) Patent No.: US 12,228,212 B2
(45) Date of Patent: Feb. 18, 2025

(54) WATER CONTROL VALVE

(71) Applicant: Chia-Po Chang, Changhua (TW)

(72) Inventor: Chia-Po Chang, Changhua (TW)

( * ) Notice: Subject to any disclaimer, the term of this patent is extended or adjusted under 35 U.S.C. 154(b) by 2 days.

(21) Appl. No.: 18/233,798

(22) Filed: Aug. 14, 2023

(65) Prior Publication Data

US 2024/0344616 A1 Oct. 17, 2024

(51) Int. Cl.
*F16K 11/074* (2006.01)
*E03C 1/04* (2006.01)

(52) U.S. Cl.
CPC ............ *F16K 11/0743* (2013.01); *E03C 1/04* (2013.01)

(58) Field of Classification Search
CPC ...... F16K 11/0743; E03C 1/04; G05D 23/022
See application file for complete search history.

(56) References Cited

U.S. PATENT DOCUMENTS

| | | | |
|---|---|---|---|
| 10,167,963 B1 * | 1/2019 | Chang | F16K 11/072 |
| 10,167,964 B1 * | 1/2019 | Chang | F16K 31/002 |
| 10,459,463 B2 * | 10/2019 | Chang | F16K 11/00 |
| 10,570,591 B2 * | 2/2020 | Chang | F16K 17/38 |
| 10,648,162 B2 * | 5/2020 | Chang | F16K 31/002 |
| 10,754,363 B2 * | 8/2020 | Fassolette | G05D 23/134 |

* cited by examiner

*Primary Examiner* — Kevin F Murphy
(74) *Attorney, Agent, or Firm* — Ying-Ting Chen; Law Office of Michael Chen

(57) ABSTRACT

A water control valve may include a valve shell, and a control base is installed therein. A sliding block, a driving valve disc, and a fixed valve disc are sequentially stacked below the control base in the valve shell. A valve base is coupled at lower end of the valve shell to block and keep the fixed valve disc, the driving valve disc, the sliding block, and the control base in the valve shell. The valve base comprises an upper base and a lower base, and a water separator is formed therebetween. Both of the upper base and the lower base have the inner spaces to accommodate a temperature limiting member therein. The temperature limiting member has a first cap, a support sleeve, a temperature sensor, a water stop jacket, and a spring, and a balance valve is positioned between the lower base and water separator.

8 Claims, 14 Drawing Sheets

A-A

A-A

B-B

C-C

D-D

WATER CONTROL VALVE

FIELD OF THE INVENTION

The present invention relates to a water control valve and more particularly to a water control valve with constant water temperature effect.

BACKGROUND OF THE INVENTION

A conventional water outlet device such as the faucet is mainly to use the valve stem of the precision ceramic control valve to provide operation by the handle, and the user can pull and rotate the handle to open/close the cold and hot water, and control the mixing ratio of cold/hot water to have warm water.

However, the conventional water control valve has following disadvantages: the precision ceramic control valve has no the function of temperature sensing and temperature limiting, and also it has no automatically importing the cold water when the temperature of outlet hot water is too high, so that the user is easy to be scalded by the hot water due to inadvertent operation.

In the market, as shown in FIG. 14, the control valve has a balance valve (70) therein, and the balance valve (70) has a pair of sleeves (71) to fit together, and a fixed valve tube (72) and a driving valve core (73) are respectively installed therein. Each of the sleeves (71) has a horizontal through hole (711) and a water inlet (712) which penetrates through the sleeve (71) from top to bottom, and the water inlet (712) is communicated with the through hole (711). The pair of horizontal through holes (711) are adapted to receive the fixed valve tube (72) and the driving valve core (73) therein, and the fixed valve tube (72) is positioned in the through holes (711). An O-ring is disposed on the fixed valve tube (72), and two first openings (721) are respectively formed on the fixed valve tube (72) adjacent to two ends thereof. Each of two ends of the driving valve core (73) is concaved inwardly to form a chamber (731), and the two chambers (731) are separated by a partition plate (732), and each of the chambers (731) has a second opening (733) thereon. When in use, the balance valve (70) is placed into the second housing (81) of the valve base (80), and the driving valve core (73) is adapted to be moved in the fixed valve tube (72) in response to changes in water pressure from the hot and cold water supply. The driving valve core (73) is adapted to be moved and to change the relative positions with the fixed valve tube (72), the first openings (721), and the second openings (733), so as to achieve automatic balancing of water pressure of both sides.

However, the above-mentioned conventional water control valve has following disadvantages: the balance valve (70) relying on the pair of combined first housings (71) is positioned in the second housing (81) might have leakage problem between the second housing (81) and the balance valve (70) due to incomplete sealing, and the water control vale is relatively large in size. Therefore, there remains a need for a new and improved design for a water control valve to overcome the problems presented above.

SUMMARY OF THE INVENTION

The present invention provides a water control valve comprising a valve shell, and a control base is installed therein. A sliding block, a driving valve disc, and a fixed valve disc are sequentially stacked below the control base in the valve shell, and a valve stem pivotally connected in the control base is adapted to upwardly protrude out from the valve shell. The valve stem has a pulling portion at the bottom end thereof, and the pulling portion is engaged with the sliding block while the sliding block is engaged with the driving valve disc, so that by operating the valve stem to move the sliding block, the driving valve disc is driven by the sliding block to have translation, or have rotation after translation, so as to change the relative positions between the driving valve disc and the fixed valve disc, thereby controlling the on/off operation of the water flow, and adjusting the mixing ratio of cold and hot water and the amount of water flow.

A valve base is coupled at the lower end of the valve shell to block and keep the fixed valve disc, the driving valve disc, the sliding block, and the control base in the valve shell. The valve base comprises an upper base and a lower base, and a water separator is formed between the upper base and the lower base. Both of the upper base and the lower base have the inner spaces so as to accommodate a temperature limiting member therein. The temperature limiting member has a first cap, a support sleeve, a temperature sensor, a water stop jacket, and a spring, and a balance valve is positioned between the lower base and the water separator. The bottom surface of the driving valve disc is respectively concaved to form a first cold water hole and a first hot water hole, and a first extending portion and a second extending portion are respectively formed at one side of the first cold water hole and one side of the first hot water hole so as to increase the coverages of the first cold water hole and the first hot water hole. The fixed valve disc has a second cold water hole and a second hot water hole penetrating the center portion thereof, and the fixed valve disc comprises a third extending portion downwardly concaved from the top surface of the fixed valve disc to connect to one side of the second cold water hole while a fourth extending portion is upwardly concaved from the bottom surface of the fixed valve disc to connect to one side of the hot water hole. The second cold water hole has a first cold water outlet on the outer side thereof to penetrate through the fixed valve disc while the second hot water hole comprises a first hot water outlet on the outer side thereof to penetrate through the fixed valve disc. A first temperature control hole is formed between one end of the first cold water outlet and one end of the first hot water outlet. The upper base of the valve base comprises a third cold water hole, a third hot water hole, a second cold water outlet, a second hot water outlet, and a second temperature control hole penetrating therethrough, and the lower base of the valve base has a cold water inlet hole, a hot water inlet hole, at least a cold water outlet hole, and a mixing water outlet hole penetrating therethrough. The cold water inlet hole and the hot water inlet hole are used to connect to the cold and hot water sources respectively, and the top surface of the lower base is downwardly concaved to form a lower slot, so that the cold water inlet hole and the hot water inlet hole are configured to downwardly penetrate the lower base through the lower slot. When the fixed valve disc, the driving valve disc, and sliding block are stacked in sequence inside the valve shell, the upper base of the valve base is utilized to support the fixed valve disc, the driving valve disc, the sliding block, and the control base, and the fixed valve disc is secured on the top surface of the upper base, and the third cold water hole, the third hot water hole, the second cold water outlet, the second hot water outlet, and the second temperature control hole of the upper base are respectively aligned with the second cold water hole, the fourth extending portion, the first cold water outlet, the first hot water outlet, and the first temperature control hole of the fixed valve disc.

When the valve stem is not operated, the first cold water hole and the first extending portion of the driving valve disc are misaligned with the first cold water outlet and the first temperature control hole of the fixed valve disc, and the first hot water hole and the second extending portion of the driving valve disc are misaligned with the second hot water hole of the fixed valve disc, so that both cold and hot water are blocked by the driving valve disc and not flow out through the water outlet device. The water separator comprises an upper slot on the bottom surface thereof, and two first water inlets in the upper slot upwardly penetrate through the water separator. When the upper base, the water separator, and the lower base are stacked in sequence, and the balance valve is installed within the upper slot and the lower slot, the cold and hot water entering the lower base is configured to pass through the balance valve, the two first water inlets, the third cold water hole, and the third hot water hole into the inside of the valve shell. The water separator has a temperature control chamber and a third cold water outlet penetrating therethrough, and the water separator comprises a third temperature control hole downward concavely formed on the top surface thereof. The end of the third temperature control hole penetrates into the side of the temperature control chamber through at least a notch.

The first cap is a closed cover with an open end facing downwards, and a plurality of hot water through holes respectively penetrating through the first cap. A plurality of protruding portions are separately formed on the inner edge of the support sleeve to form each of the outlet channels between two adjacent protruding portions. The support sleeve is connected in the mixing water outlet hole of the lower base, and the protruding portions are adapted to support the placement of the temperature sensor. A top rod is connected and inserted into one open end of the temperature sensor, and a chemical substance filled into the temperature sensor is adapted to undergo thermal expansion and contraction when the ambient temperature is changed, such that the top rod is significantly pushed by the chemical substance when the chemical substance is heated and expanded to protrude out from the open end of the temperature sensor, and the chemical substance returns to its original volume after cooling. The water stop jacket comprises a tubular body and a housing which has an opening facing downwards, and the housing and the tubular body are sleeved together and are connected through one bottom edge, and the bottom edge has a plurality of first water through holes which are spaced, and the one end of the temperature sensor having the top rod is adapted to pass through the housing, so that the water stop jacket is configured to cover the temperature sensor. The spring is abutted between the first cap and the water stop jacket such that the spring is adapted to push the water stop jacket when the top rod is retracted in its normal state, and the tubular body of the water stop jacket is moved downwardly and misaligned with the hot water through holes of the first cap and not blocks the hot water through holes. The water stop jacket is supported and elevated by the temperature sensor, so as to prevent the notch of the water separator from being blocked by the tubular body of the water stop jacket, and the notch is adapted to keep communicating with the outlet channel of the support sleeve. The first cap is installed in the upper base, and the temperature sensor and the water stop jacket are configured to pass through the temperature control chamber of the water separator. The balance valve comprises a fixed valve tube, a driving valve core, and an upper cap, and the driving valve core and the fixed valve tube respectively have a couple of second hollow holes and a couple of first hollow holes. The fixed valve tube is sleeved on the driving valve core, and the fixed valve tube and the driving valve core are positioned in the lower slot of the lower base, and the upper cap having a first water hole is capped on the lower base. Two glued portions are respectively formed on the positions between the upper base and the water separator and between the upper cap and the lower base so as to achieve the anti-leakage effects therebetween.

Comparing with conventional water control valve, the present invention is advantageous because: (i) when the handle is rotated too far toward the direction of the hot water, or when the cold water is insufficient for mixing in the pipeline to cause the temperature sensor to overheat, the mechanism appropriately cools the excessively hot water before flowing out from water outlet device at constant temperature, or even shuts off the hot water, so as to prevent the risk of accidental burns to users due to careless operation; (ii) the installation of the balance valve has the effect of automatically balancing the inlet water pressure of cold and hot water; and (iii) the fixed valve tube and the driving valve core are sleeved and directly placed into the lower slot for installation, which reduces the occupied volume (no need for an additional pair of sleeve), and through the glued portions, the upper base and the water separator, and the upper cap and the lower base are firmly bonded so as to achieve the anti-leakage effect.

DETAILED DESCRIPTION OF THE INVENTION

Figure 1:
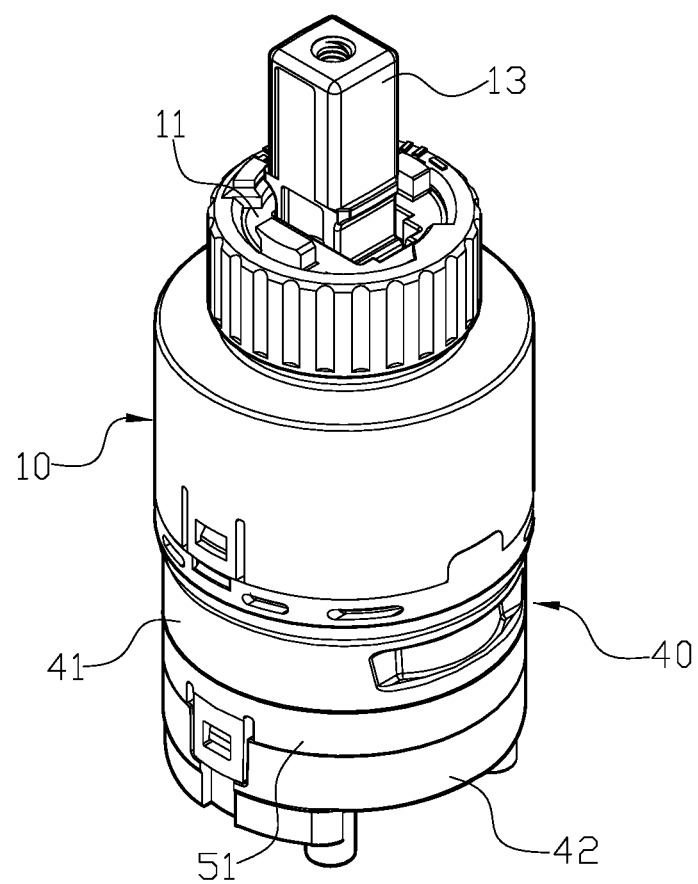
FIG. 1 is a three-dimensional assembly view of a water control valve of the present invention.
Figure 2:
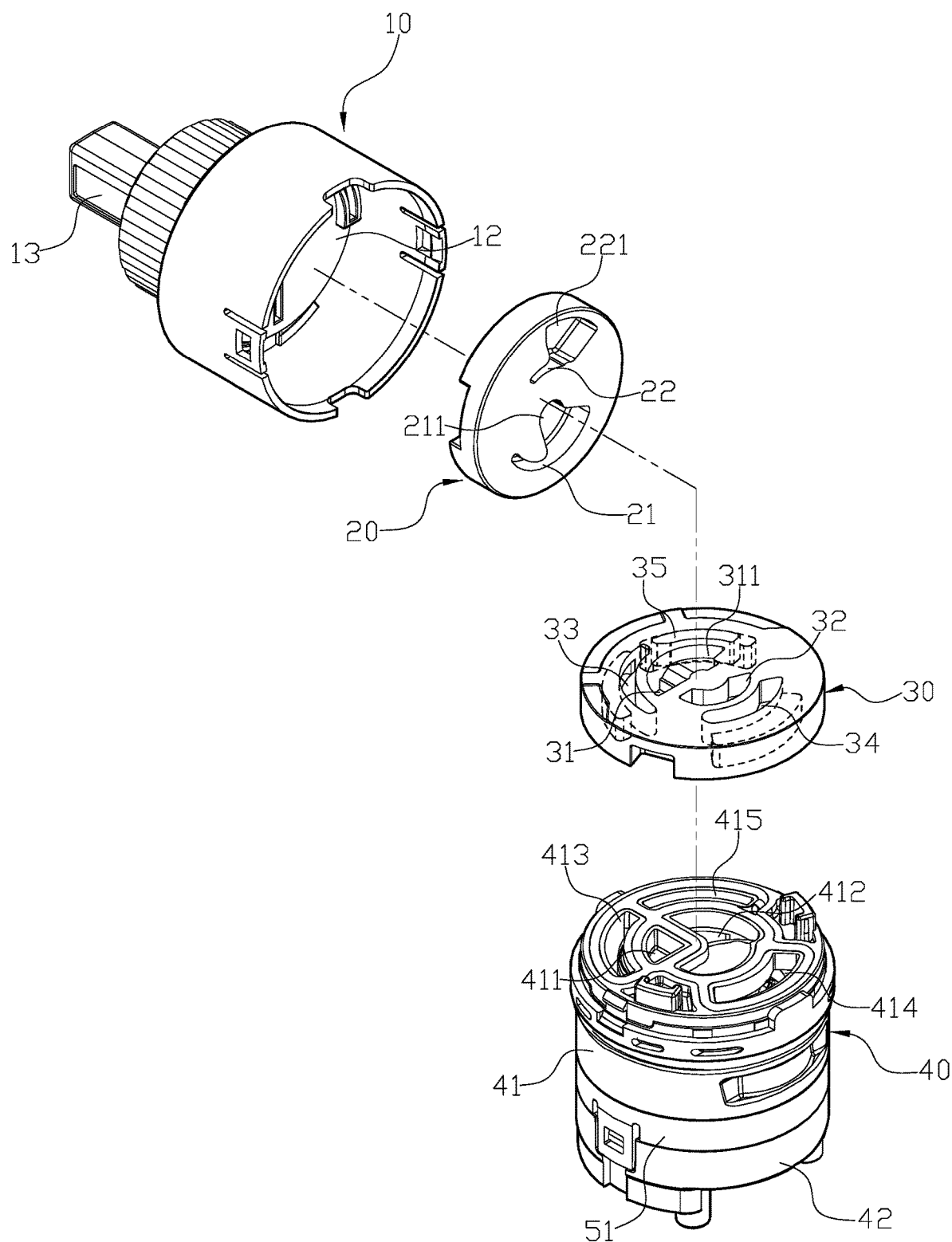
FIG. 2 is a three-dimensional exploded view of the water control valve of the present invention.
Figure 3:
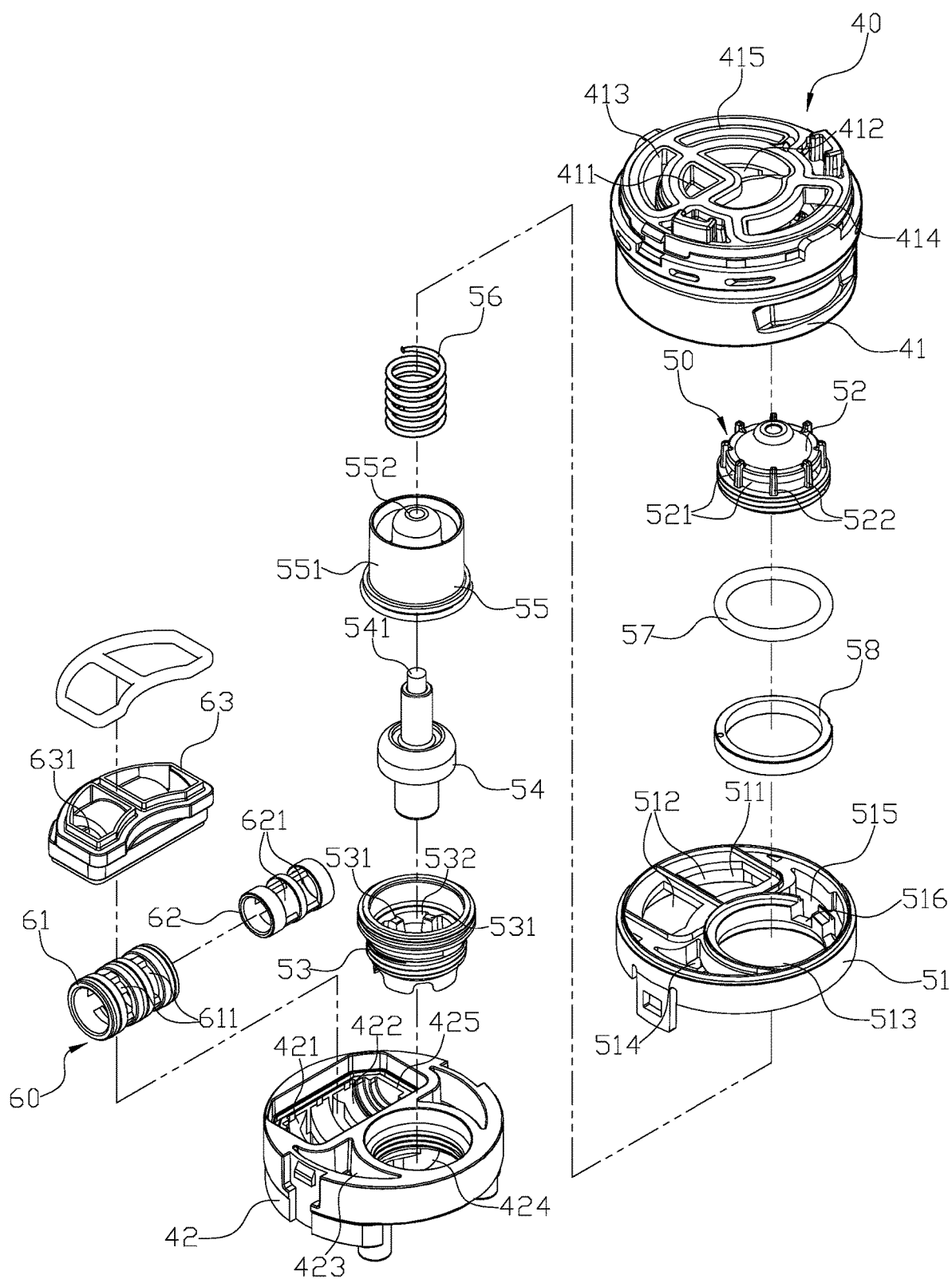
FIG. 3 is a detailed exploded view of a temperature limiting member and a balance valve of the water control valve in the present invention.
Figure 4:
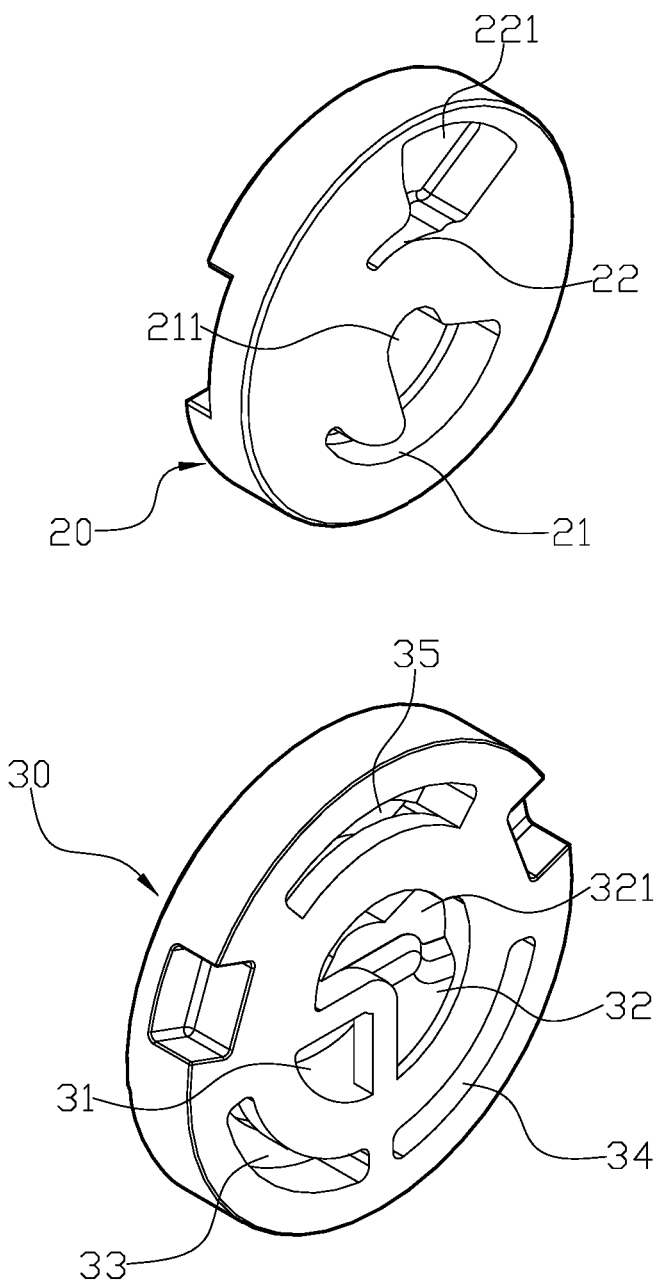
FIG. 4 is a three-dimensional view from another angle of a driving valve disc and a fixed valve disc of the water control valve in the present invention.
Figure 5:
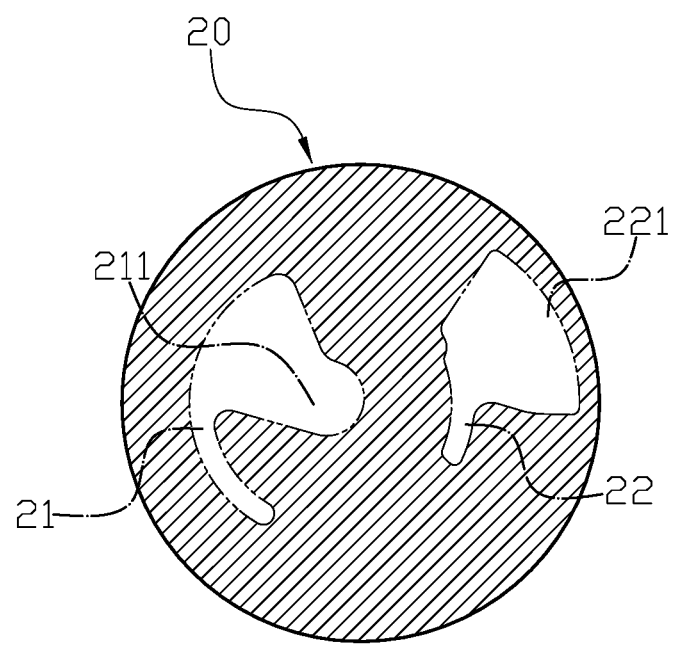
FIG. 5 is a plan view of the driving valve disc and the fixed valve disc of the water control valve in the present invention.
Figure 5:
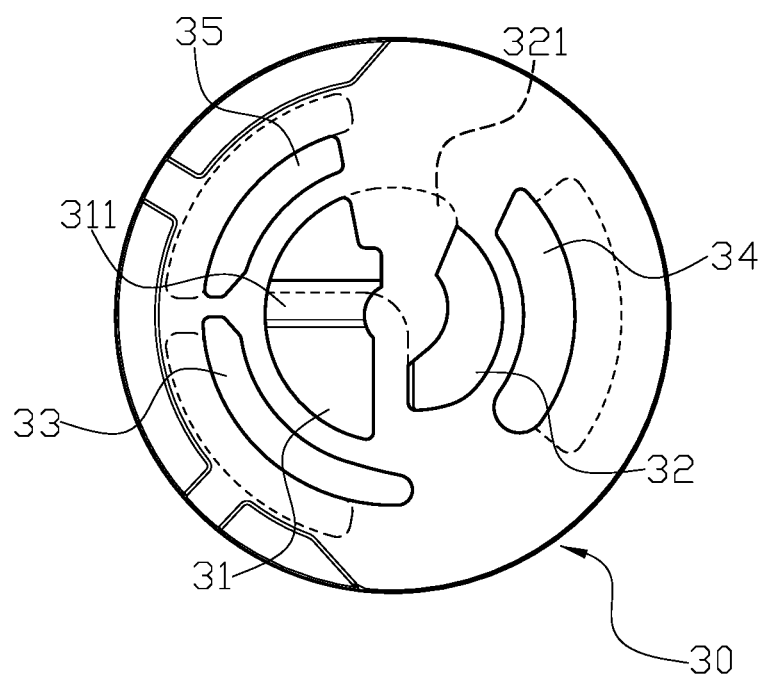
Figure 6:
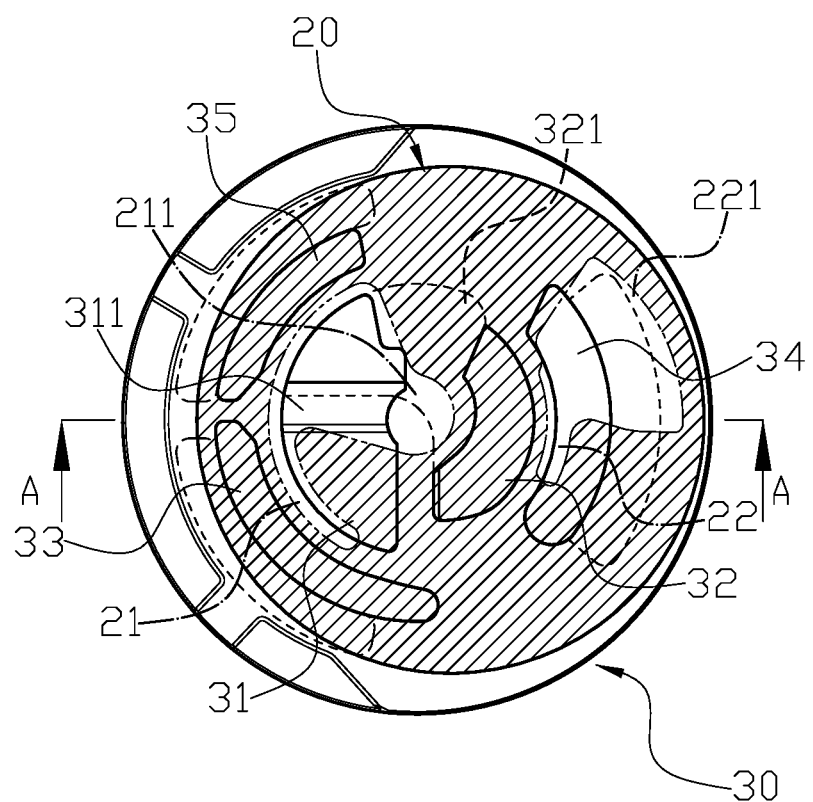
FIG. 6 is a schematic view illustrating the relative positions between the driving valve disc and the fixed valve disc of the water control valve in the present invention when the water outlet device is turned off.
Figure 7:
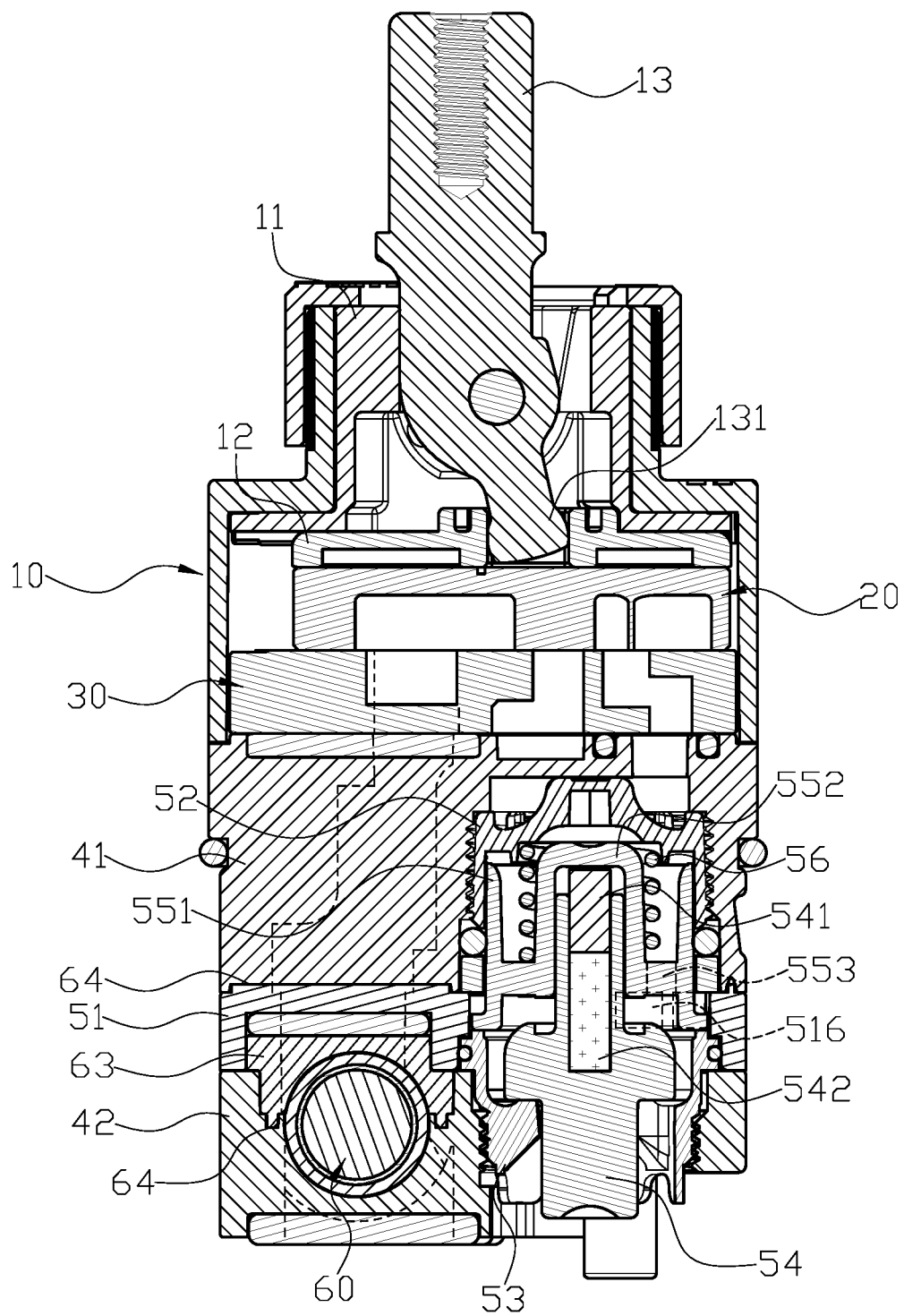
FIG. 7 is a sectional view of the water control valve of the present invention when the water outlet device is turned off.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 7, the present invention provides a water control valve comprising a valve shell (10), and a control base (11) is installed therein. A sliding block (12), a driving valve disc (20), and a fixed valve disc (30) are sequentially stacked below the control base (11) in the valve shell (10), and a valve stem (13) pivotally connected in the control base (11) is adapted to upwardly protrude out from the valve shell (10). The valve stem (13) has a pulling portion (131) at the bottom end thereof, and the pulling portion (131) is engaged with the sliding block (12) while the sliding block (12) is engaged with the driving valve disc (20), so that by operating the valve stem (13) to move the sliding block (12), the driving valve disc (20) is driven by the sliding block (12) to have translation, or have rotation after translation, so as to change the relative positions between the driving valve disc (20) and the fixed valve disc (30), thereby controlling the on/off operation of the water flow, and adjusting the mixing ratio of cold and hot water and the amount of water flow. A valve base (40) is coupled at the lower end of the valve shell (10) to block and keep the fixed valve disc (30), the driving valve disc (20), the sliding block (12), and the control base (11) in the valve shell (10). The valve base (40) comprises an upper base (41) and a lower base (42), and a water separator (51) is formed between the upper base (41) and the lower base (42). Moreover, both of the upper base (41) and the lower base (42) have the inner spaces so as to accommodate a temperature limiting member (50) therein. The temperature limiting member (50) has a first cap (52), a support sleeve (53), a temperature sensor (54), a water stop jacket (55), and a spring (56), and a balance valve (60) is positioned between the lower base (42) and the water separator (51). The bottom surface of the driving valve disc (20) is respectively concaved to form a first cold water hole (21) and a first hot water hole (22), and a first extending portion (211) and a second extending portion (221) are respectively formed at one side of the first cold water hole (21) and one side of the first hot water hole (22) so as to increase the coverages of the first cold water hole (21) and the first hot water hole (22). In addition, the fixed valve disc (30) has a second cold water hole (31) and a second hot water hole (32) penetrating the center portion thereof, and the fixed valve disc (30) comprises a third extending portion (311) downwardly concaved from the top surface of the fixed valve disc (30) to connect to one side of the second cold water hole (31) while a fourth extending portion (321) is upwardly concaved from the bottom surface of the fixed valve disc (30) to connect to one side of the hot water hole (32). Furthermore, the second cold water hole (31) has a first cold water outlet (33) on the outer side thereof to penetrate through the fixed valve disc (30) while the second hot water hole (32) comprises a first hot water outlet (34) on the outer side thereof to penetrate through the fixed valve disc (30). Also, a first temperature control hole (35) is formed between one end of the first cold water outlet (33) and one end of the first hot water outlet (34). The upper base (41) of the valve base (40) comprises a third cold water hole (411), a third hot water hole (412), a second cold water outlet (413), a second hot water outlet (414), and a second temperature control hole (415) penetrating therethrough, and the lower base (42) of the valve base (40) has a cold water inlet hole (421), a hot water inlet hole (422), at least a cold water outlet hole (423), and a mixing water outlet hole (424) penetrating therethrough. The cold water inlet hole (421) and the hot water inlet hole (422) are used to connect to the cold and hot water sources respectively, and the top surface of the lower base (42) is downwardly concaved to form a lower slot (425), so that the cold water inlet hole (421) and the hot water inlet hole (422) are configured to downwardly penetrate the lower base (42) through the lower slot (425). When the fixed valve disc (30), the driving valve disc (20), and sliding block (12) are stacked in sequence inside the valve shell (10), the upper base (41) of the valve base (40) is utilized to support the fixed valve disc (30), the driving valve disc (20), the sliding block (12), and the control base (11), and the fixed valve disc (30) is secured on the top surface of the upper base (41), and the third cold water hole (411), the third hot water hole (412), the second cold water outlet (413), the second hot water outlet (414), and the second temperature control hole (415) of the upper base (41) are respectively aligned with the second cold water hole (31), the fourth extending portion (321), the first cold water outlet (33), the first hot water outlet (34), and the first temperature control hole (35) of the fixed valve disc (30). When the valve stem (13) is not operated, the first cold water hole (21) and the first extending portion (211) of the driving valve disc (20) are misaligned with the first cold water outlet (33) and the first temperature control hole (35) of the fixed valve disc (30), and the first hot water hole (22) and the second extending portion (221) of the driving valve disc (20) are misaligned with the second hot water hole (32) of the fixed valve disc (30), so that both cold and hot water are blocked by the driving valve disc (20) and not flow out through the water outlet device. The water separator (51) comprises an upper slot (511) on the bottom surface thereof, and two first water inlets (512) in the upper slot (511) upwardly penetrate through the water separator (51). When the upper base (41), the water separator (51), and the lower base (42) are stacked in sequence, and the balance valve (60) is installed within the upper slot (511) and the lower slot (425), the cold and hot water entering the lower base (42) is configured to pass through the balance valve (60), the two first water inlets (512), the third cold water hole (411), and the third hot water hole (412) into the inside of the valve shell (10). The water separator (51) has a temperature control chamber (513) and a third cold water outlet (514) penetrating therethrough, and the water separator (51) comprises a third temperature control hole (515) downward concavely formed on the top surface thereof. The end of the third temperature control hole (515) penetrates into the side of the temperature control chamber (513) through at least a notch (516). The first cap (52) is a closed cover with an open end facing downwards, and a plurality of hot water through holes (521) respectively penetrating through the first cap (52). A plurality of protruding portions (531) are separately formed on the inner edge of the support sleeve (53) to form each of the outlet channels (532) between two adjacent protruding portions (531). The support sleeve (53) is connected in the mixing water outlet hole (424) of the lower base (42), and the protruding portions (531) are adapted to support the placement of the temperature sensor (54). A top rod (541) is connected and inserted into one open end of the temperature sensor (54), and a chemical substance (542) filled into the temperature sensor (54) is adapted to undergo thermal expansion and contraction when the ambient temperature is changed, such that the top rod (541) is significantly pushed by the chemical substance (542) when the chemical substance (542) is heated and expanded to protrude out from the open end of the temperature sensor (54) while the chemical substance (542) returns to its original volume after cooling. The water stop jacket (55) comprises a tubular body (551) and a housing (552) which has an opening facing downwards, and the housing (552) and the tubular body (551) are sleeved together and are connected through one bottom edge, and the bottom edge has a plurality of first water through holes (553) which are spaced, and the one end of the temperature sensor (54) having the top rod (541) is adapted to pass through the housing (552), so that the water stop jacket (55) is configured to cover the temperature sensor (54). The spring (56) is abutted between the first cap (52) and the water stop jacket (55) such that the spring (56) is adapted to push the water stop jacket (55) when the top rod (541) is retracted in its normal state, and the tubular body (551) of the water stop jacket (55) is moved downwardly and misaligned with the hot water through holes (521) of the first cap (52) and not blocks the hot water through holes (521). The water stop jacket (55) is supported and elevated by the temperature sensor (54), so as to prevent the notch (516) of the water separator (51) from being blocked by the tubular body (551) of the water stop jacket (55), and the notch (516) is adapted to keep communicating with the outlet channel (532) of the support sleeve (53). The first cap (52) is installed in the upper base (41), and the temperature sensor (54) and the water stop jacket (55) are configured to pass through the temperature control chamber (513) of the water separator (51). Moreover, the balance valve (60) comprises a fixed valve tube (61), a driving valve core (62), and an upper cap (63), and the driving valve core (62) and the fixed valve tube (61) respectively have a couple of second hollow holes (621) and a couple of first hollow holes (611). The fixed valve tube (61) is sleeved on the driving valve core (62), and the fixed valve tube (61) and the driving valve core (62) are positioned in the lower slot (425) of the lower base (42), and the upper cap (63) having a first water hole (631) is capped on the lower base (42). Two glued portions (64) are respectively formed on the positions between the upper base (41) and the water separator (51) and between the upper cap (63) and the lower base (42) so as to achieve the anti-leakage effects therebetween.

Figure 8:
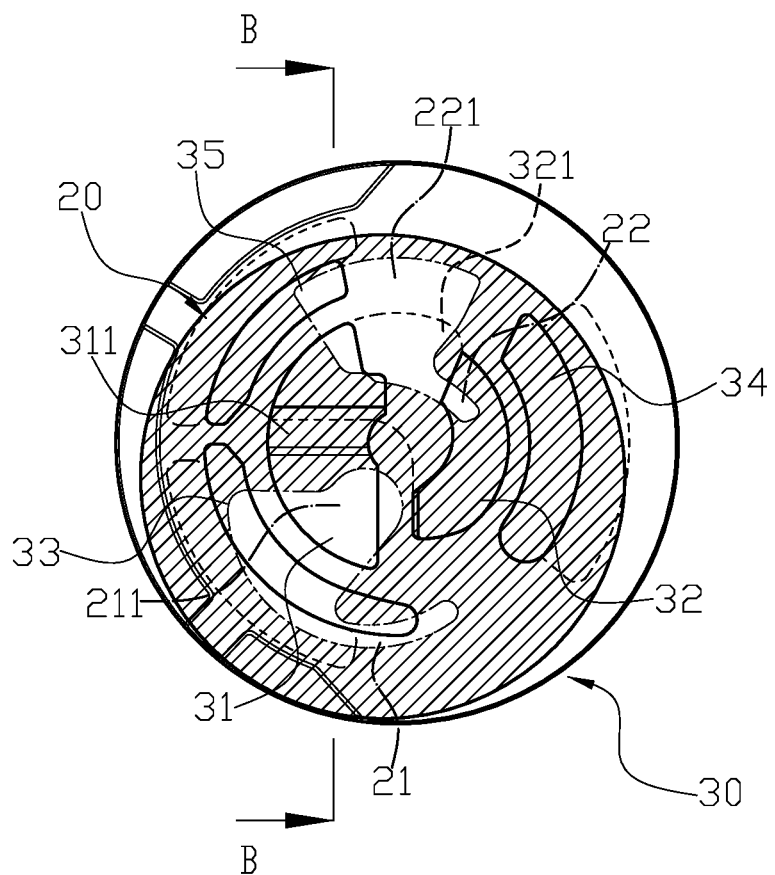
FIG. 8 is a schematic view illustrating the relative positions between the driving valve disc and the fixed valve disc of the water control valve in the present invention when the cold water is fully provided.
Figure 9:
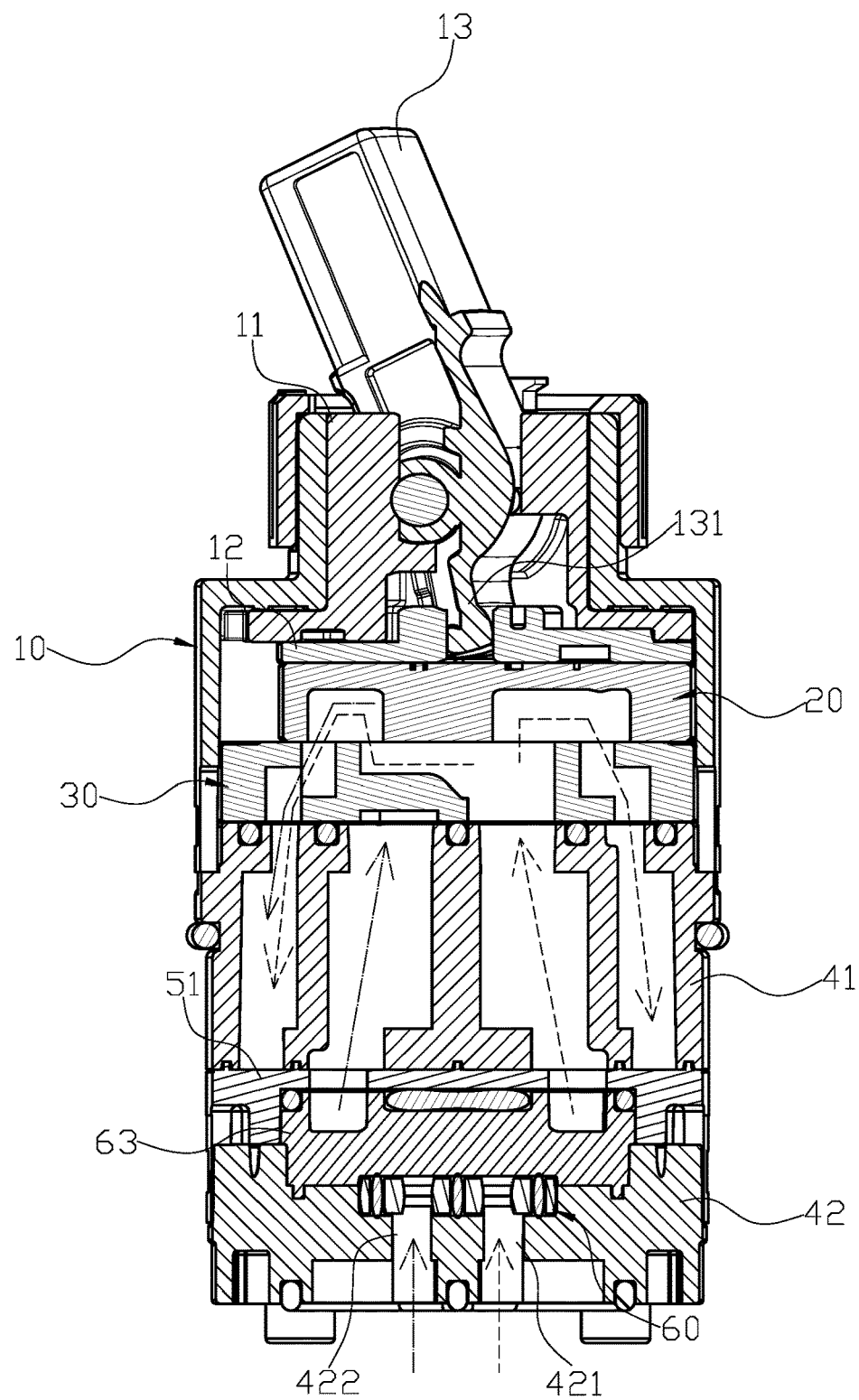
FIG. 9 is a sectional view of the water control valve of the present invention when the cold water is fully provided.

The water control valve is installed in the water outlet device such as a faucet, and the valve stem (13) is adapted to connect to a handle for operation. When the handle is pulled up, the valve stem (13) is configured to drive the driving valve disc (20) to have translation through the sliding block (12), and the first cold water hole (21) and the first extending portion (211) of the driving valve disc (20) are respectively aligned with the second cold water hole (31) and the first cold water outlet (33) of the fixed valve disc (30), so that the cold water is adapted to flow through the cold water inlet hole (421), the balance valve (60), one first water inlet (512), the third cold water hole (411), and the second cold water hole (31) to the first cold water hole (21) and the first extending portion (211), and flow through the first cold water outlet (33), the second cold water outlet (413), the third cold water outlet (514), the cold water outlet hole (423), and out of the water outlet device. When the cold water amount needs to be increased, the handle is rotated toward the direction of the cold water (as shown in FIGS. 8 and 9), the translation or the rotation of the driving valve disc (20) is not enough to align the first hot water hole (22) and the second extending portion (221) with the first hot water outlet (34), so as to prevent the hot water from flowing out of the water control valve.

Figure 10:
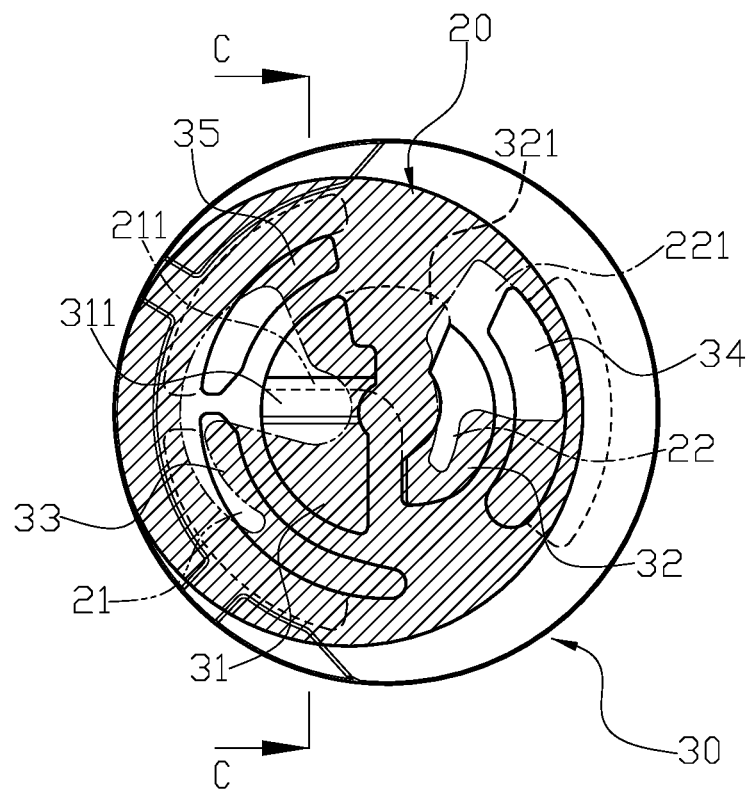
FIG. 10 is a schematic view illustrating the relative positions between the driving valve disc and the fixed valve disc of the water control valve in the present invention when the cold and hot water are mixed.
Figure 11:
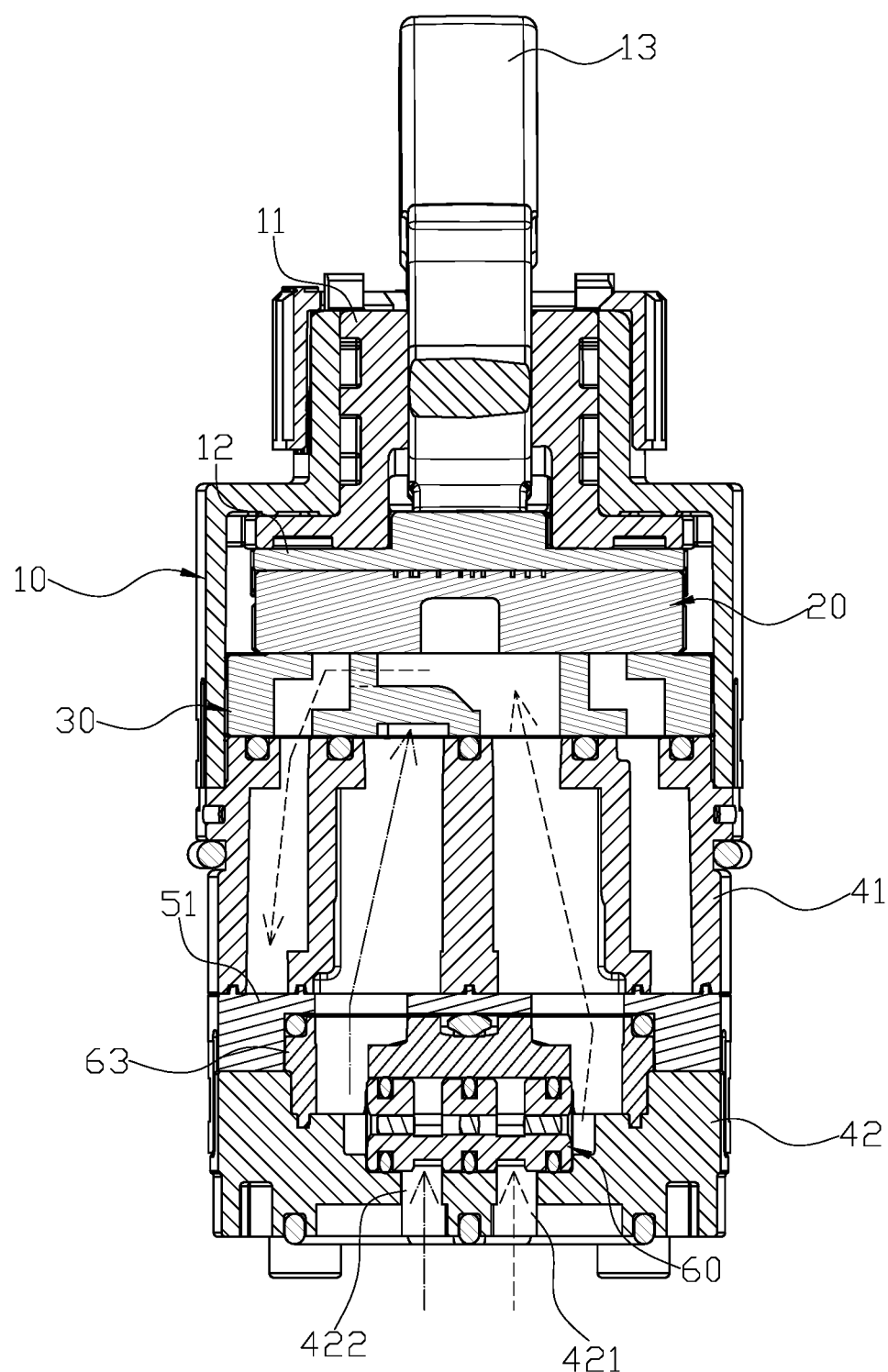
FIG. 11 is a sectional view of water control valve of the present invention when the cold and hot water are mixed.
Figure 12:
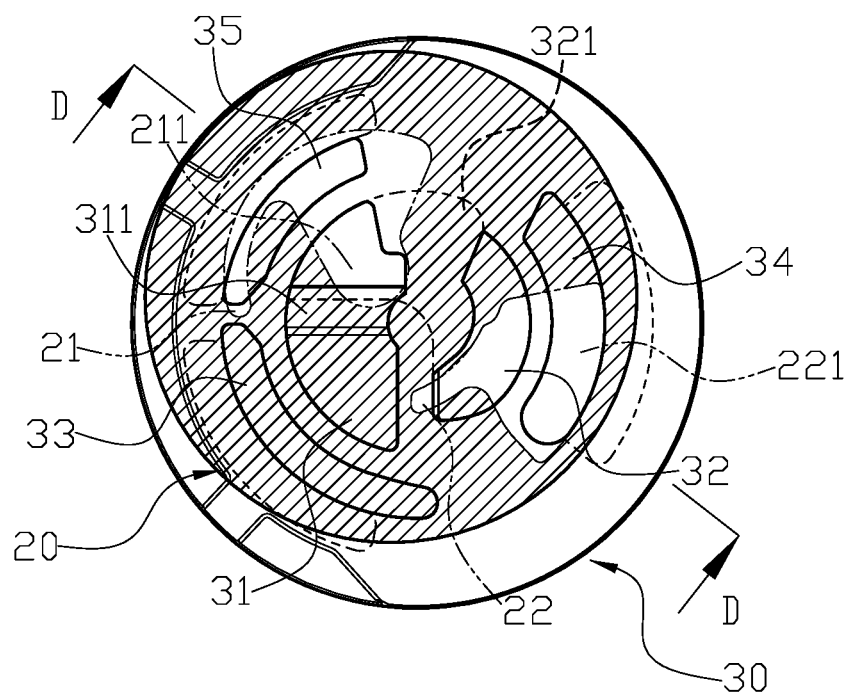
FIG. 12 is a schematic view illustrating the relative positions between the driving valve disc and the fixed valve disc of the water control valve in the present invention when the hot water is fully provided.
Figure 13:
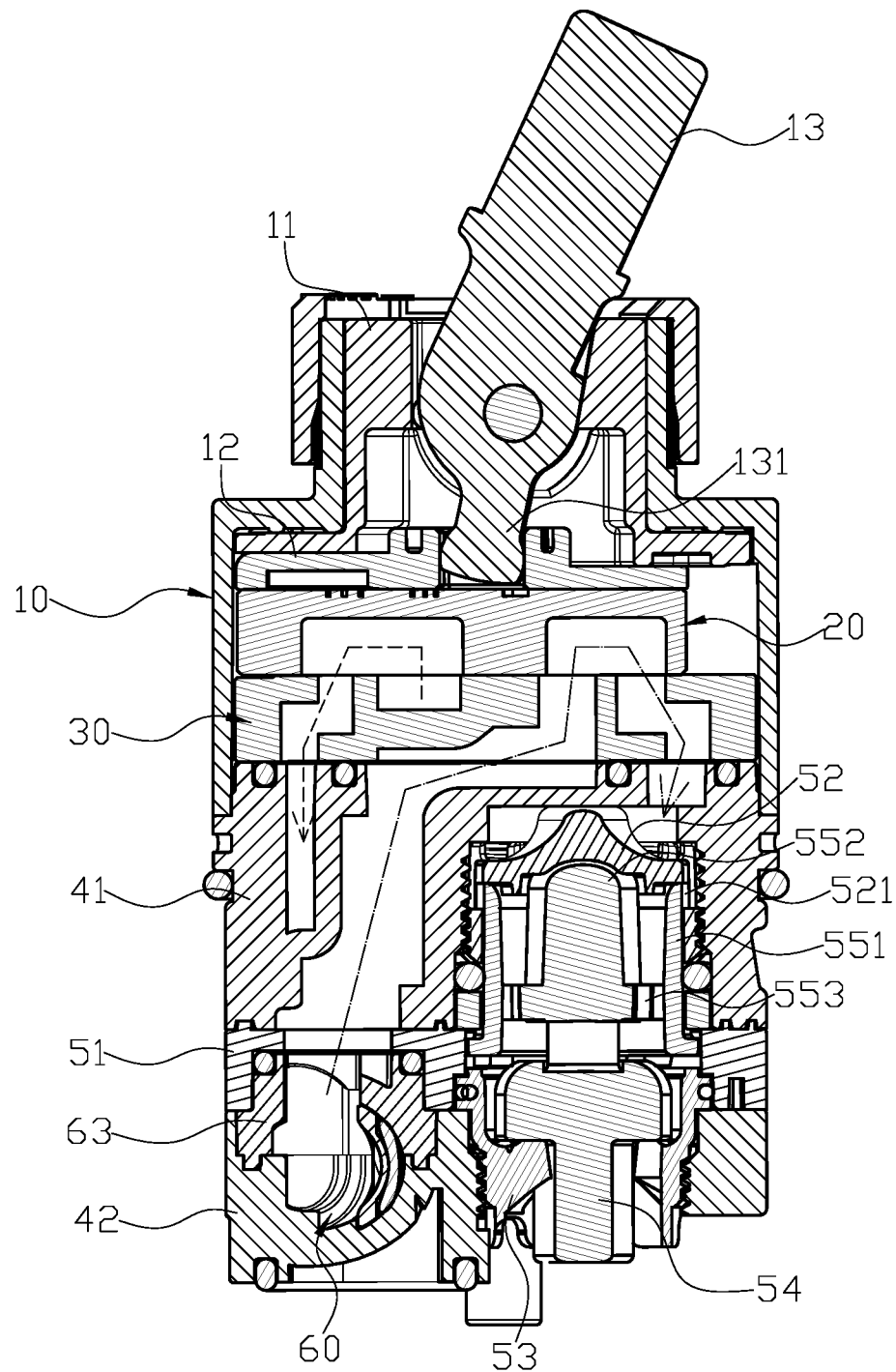
FIG. 13 is a sectional view of water control valve of the present invention when the hot water is fully provided.
Figure 14:
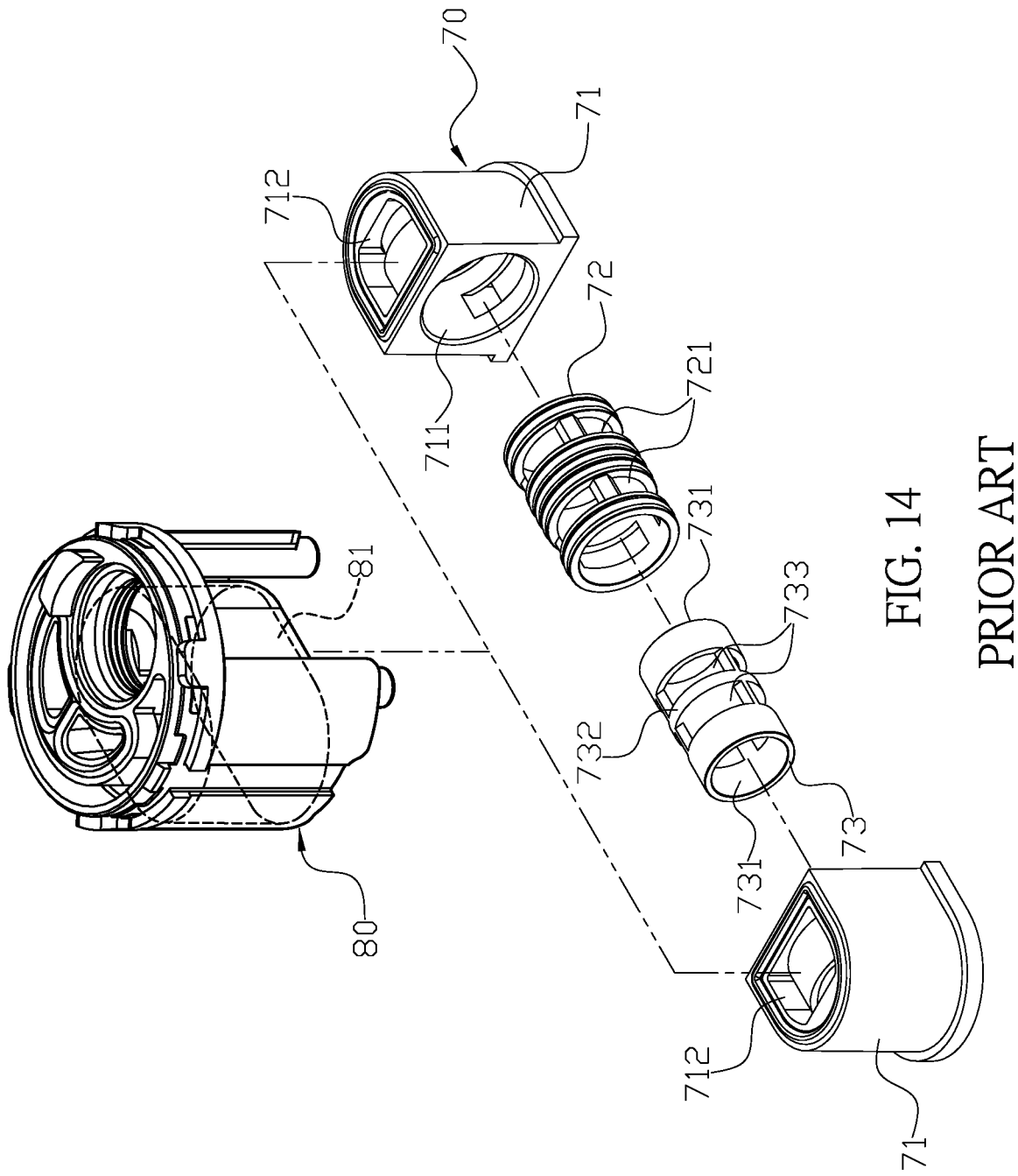
FIG. 14 is a prior art.

In the process of water discharging, when the warm water is needed, the handle is rotated toward the direction of the hot water, the first hot water hole (22) and the first extending portion (221) of the driving valve disc (20) are respectively aligned with the second hot water hole (32) and the first hot water outlet (34) of the fixed valve disc (30), and the hot water is configured to flow through the hot water inlet hole (422), the balance valve (60), the other first water inlet (512), the third hot water hole (412), the second hot water hole (32) to the first hot water hole (22) and the second extending portion (221), and flow through the first hot water outlet (34), the second hot water outlet (414), the hot water through holes (521) of the first cap (52), the first water through hole (553) of the water stop jacket (55), the outlet channel (532) of the support sleeve (53), the mixing water outlet hole (424), and out of the water outlet device. Furthermore, when the handle is rotated toward the direction of the hot water, the first cold water hole (21) and the first extending portion (211) of the driving valve disc (20) are respectively aligned with the third extending portion (311) of the second cold water hole (31) and the first temperature control hole (35), so that the cold water flowing into the control valve is adapted to flow through the first cold water hole (21) and the first extending portion (211), the first temperature control hole (35), the second temperature control hole (415), the third temperature control hole (515), the notch (516), and into the support sleeve (53), such that the cold and hot water is mixed in the support sleeve (53) into the warm water flowing out for use (referring to FIGS. 10 and 11). When the handle is rotated too far toward the direction of the hot water (as shown in FIG. 12), or when the cold water is insufficient for mixing in the pipeline to cause the temperature sensor (54) to overheat, the top rod (541) is pushed out by the chemical substance (542) in the temperature sensor (54), and the top rod (541) is configured to lift and support the water stop jacket (55), such that the tubular body (551) of the water stop jacket (55) is adapted to gradually reduce the aperture sized of the hot water through holes (521) of the first cap (52), or to completely block the hot water through holes (521) (as shown in FIG. 13). Thus, the mechanism appropriately cools the excessively hot water before flowing out from water outlet device at constant temperature, or even shuts off the hot water, so as to prevent the risk of accidental burns to users due to careless operation. Additionally, the design is highly effective in preventing curious children from getting scalded by the water outlet device, thereby ensuring their safety.

In one embodiment, the first cold water outlet (33) comprises a first upper hole portion and a first lower hole portion, and the first upper hole portion and the first lower hole portion are misaligned to respectively penetrate through the top surface and the bottom surface of the fixed valve disc (30).

In another embodiment, the hot water outlet (34) has a second upper hole portion and a second lower hole portion, and the second upper hole portion and the second lower hole portion are misaligned to respectively penetrate through the top surface and the bottom surface of the fixed valve disc (30).

In still another embodiment, the first temperature control hole (35) has a third upper hole portion and a third lower hole portion, and the third upper hole portion and the third lower hole portion are misaligned to respectively penetrate through the top surface and the bottom surface of the fixed valve disc (30).

In a further embodiment, the periphery of the first cap (52) has a plurality of ribs (522) upwardly protruding from the top surface of the first cap (52), and the ribs (522) are spaced apart to allow the hot water to flow through the gaps between the ribs (522) and enter the first cap (52) through the hot water through holes (521) located on the periphery of the first cap (52).

In still a further embodiment, a first sealing ring (57) and a second sealing ring (58) are disposed on the temperature limiting member (50).

In an advantageous embodiment, the temperature at which the chemical substance (542) begins to expand when heated is set at 40 degrees Celius.

In another advantageous embodiment, the glued portions (64) respectively formed on the positions between the upper base (41) and the water separator (51) and between the upper cap (63) and the lower base (42) are formed by high-frequency bonding technology.

In a preferred embodiment, the glued portions (64) respectively formed on the positions between the upper base (41) and the water separator (51) and between the upper cap (63) and the lower base (42) are formed by ultrasonic bonding technology.

In another preferred embodiment, an O-ring is disposed on the upper cap (63).

Comparing with conventional water control valve, the present invention is advantageous because: (i) when the handle is rotated too far toward the direction of the hot water, or when the cold water is insufficient for mixing in the pipeline to cause the temperature sensor to overheat, the mechanism appropriately cools the excessively hot water before flowing out from water outlet device at constant temperature, or even shuts off the hot water, so as to prevent the risk of accidental burns to users due to careless operation; (ii) the installation of the balance valve (60) has the effect of automatically balancing the inlet water pressure of cold and hot water; and (iii) the fixed valve tube (61) and the driving valve core (62) are sleeved and directly placed into the lower slot (425) for installation, which reduces the occupied volume (no need for an additional pair of sleeve), and through the glued portions (64), the upper base (41) and the water separator (51), and the upper cap (63) and the lower base (42) are firmly bonded so as to achieve the anti-leakage effect.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water control valve comprising a valve shell, a driving valve disc, a fixed valve disc, a valve base, a temperature limiting member, and a balance valve;

wherein the valve shell has a control base installed therein; a sliding block, the driving valve disc, and the fixed valve disc are sequentially stacked below the control base in the valve shell, and a valve stem pivotally connected in the control base is adapted to upwardly protrude out from the valve shell; the valve stem has a pulling portion at the bottom end thereof, and the pulling portion is engaged with the sliding block while the sliding block is engaged with the driving valve disc, so that by operating the valve stem to move the sliding block, the driving valve disc is driven by the sliding block to have translation and to have rotation after translation, so as to change the relative positions between the driving valve disc and the fixed valve disc, thereby controlling the on/off operation of the water flow, and adjusting the mixing ratio of cold and hot water and the amount of water flow; the valve base is coupled at the lower end of the valve shell to block and keep the fixed valve disc, the driving valve disc, the sliding block, and the control base in the valve shell; the valve base comprises an upper base and a lower base, and a water separator is formed between the upper base and the lower base; both of the upper base and the lower base have the inner spaces so as to accommodate the temperature limiting member therein; the temperature limiting member has a first cap, a support sleeve, a temperature sensor, a water stop jacket, and a spring, and the balance valve is positioned between the lower base and the water separator;

wherein the bottom surface of the driving valve disc is respectively concaved to form a first cold water hole and a first hot water hole, and a first extending portion and a second extending portion are respectively formed at one side of the first cold water hole and one side of the first hot water hole so as to increase the coverages of the first cold water hole and the first hot water hole;

wherein the fixed valve disc has a second cold water hole and a second hot water hole penetrating the center portion thereof, and the fixed valve disc comprises a third extending portion downwardly concaved from the top surface of the fixed valve disc to connect to one side of the second cold water hole while a fourth extending portion is upwardly concaved from the bottom surface of the fixed valve disc to connect to one side of the hot water hole; the second cold water hole has a first cold water outlet on the outer side thereof to penetrate through the fixed valve disc while the second hot water hole comprises a first hot water outlet on the outer side thereof to penetrate through the fixed valve disc; a first temperature control hole is formed between one end of the first cold water outlet and one end of the first hot water outlet;

wherein the upper base of the valve base comprises a third cold water hole, a third hot water hole, a second cold water outlet, a second hot water outlet, and a second temperature control hole penetrating therethrough, and the lower base of the valve base has a cold water inlet hole, a hot water inlet hole, at least a cold water outlet hole, and a mixing water outlet hole penetrating therethrough; the cold water inlet hole and the hot water inlet hole are used to connect to the cold and hot water sources respectively, and the top surface of the lower base is downwardly concaved to form a lower slot, so that the cold water inlet hole and the hot water inlet hole are configured to downwardly penetrate the lower base through the lower slot; when the fixed valve disc, the driving valve disc, and sliding block are stacked in sequence inside the valve shell, the upper base of the valve base is utilized to support the fixed valve disc, the driving valve disc, the sliding block, and the control base, and the fixed valve disc is secured on the top surface of the upper base, and the third cold water hole, the third hot water hole, the second cold water outlet, the second hot water outlet, and the second temperature control hole of the upper base are respectively aligned with the second cold water hole, the fourth extending portion, the first cold water outlet, the first hot water outlet, and the first temperature control hole of the fixed valve disc; when the valve stem is not operated, the first cold water hole and the first extending portion of the driving valve disc are misaligned with the first cold water outlet and the first temperature control hole of the fixed valve disc, and the first hot water hole and the second extending portion of the driving valve disc are misaligned with the second hot water hole of the fixed valve disc, so that both cold and hot water are blocked by the driving valve disc and not flow out through the water outlet device;

wherein the water separator comprises an upper slot on the bottom surface thereof, and two first water inlets in the upper slot upwardly penetrate through the water separator; when the upper base, the water separator, and the lower base are stacked in sequence, and the balance valve is installed within the upper slot and the lower slot, the cold and hot water entering the lower base is configured to pass through the balance valve, the two first water inlets, the third cold water hole, and the third hot water hole into the inside of the valve shell; the water separator has a temperature control chamber and a third cold water outlet penetrating therethrough, and the water separator comprises a third temperature control hole downward concavely formed on the top surface thereof; the end of the third temperature control hole penetrates into the side of the temperature control chamber through at least a notch;

wherein the first cap is a closed cover with an open end facing downwards, and a plurality of hot water through holes respectively penetrating through the first cap; a plurality of protruding portions are separately formed on the inner edge of the support sleeve to form each of the outlet channels between two adjacent protruding portions; the support sleeve is connected in the mixing water outlet hole of the lower base, and the protruding portions are adapted to support the placement of the temperature sensor; a top rod is connected and inserted into one open end of the temperature sensor, and a chemical substance filled into the temperature sensor is adapted to undergo thermal expansion and contraction when the ambient temperature is changed, such that the top rod is pushed by the chemical substance when the chemical substance is heated and expanded to protrude out from the open end of the temperature sensor, and the chemical substance returns to its original volume after cooling; the water stop jacket comprises a tubular body and a housing which has an opening facing downwards, and the housing and the tubular body are sleeved together and are connected through one bottom edge, and the bottom edge has a plurality of first water through holes which are spaced, and the one end of the temperature sensor having the top rod is adapted to pass through the housing, so that the water stop jacket is configured to cover the temperature sensor; the spring is abutted between the first cap and the water stop jacket such that the spring is adapted to push the water stop jacket when the top rod is retracted in its normal state, and the tubular body of the water stop jacket is moved downwardly and misaligned with the hot water through holes of the first cap and not blocks the hot water through holes; the water stop jacket is supported and elevated by the temperature sensor, so as to prevent the notch of the water separator from being blocked by the tubular body of the water stop jacket, and the notch is adapted to keep communicating with the outlet channel of the support sleeve; the first cap is installed in the upper base, and the temperature sensor and the water stop jacket are configured to pass through the temperature control chamber of the water separator; and wherein the balance valve comprises a fixed valve tube, a driving valve core, and an upper cap, and the driving valve core and the fixed valve tube respectively have a couple of second hollow holes and a couple of first hollow holes; the fixed valve tube is sleeved on the driving valve core, and the fixed valve tube and the driving valve core are positioned in the lower slot of the lower base, and the upper cap having a first water hole is capped on the lower base; two glued portions are respectively formed on the positions between the upper base and the water separator and between the upper cap and the lower base so as to achieve the anti-leakage effects therebetween.

2. The water control valve of claim 1, wherein the first cold water outlet comprises a first upper hole portion and a first lower hole portion, and the first upper hole portion and the first lower hole portion are misaligned to respectively penetrate through the top surface and the bottom surface of the fixed valve disc.

3. The water control valve of claim 1, wherein the hot water outlet has a second upper hole portion and a second lower hole portion, and the second upper hole portion and the second lower hole portion are misaligned to respectively penetrate through the top surface and the bottom surface of the fixed valve disc.

4. The water control valve of claim 1, wherein the first temperature control hole has a third upper hole portion and a third lower hole portion, and the third upper hole portion and the third lower hole portion are misaligned to respectively penetrate through the top surface and the bottom surface of the fixed valve disc.

5. The water control valve of claim 1, wherein the periphery of the first cap has a plurality of ribs upwardly protruding from the top surface of the first cap.

6. The water control valve of claim 1, wherein a first sealing ring and a second sealing ring are disposed on the temperature limiting member.

7. The water control valve of claim 1, wherein the glued portions respectively formed on the positions between the upper base and the water separator (51) and between the upper cap and the lower base are formed by high-frequency bonding technology.

8. The water control valve of claim 1, wherein an O-ring is disposed on the upper cap.

* * * * *